March 15, 1927.  1,621,257
D. E. KNOWLTON ET AL
METHOD OF HANDLING AND PRESERVING FISH AND THE LIKE
Filed Oct. 13, 1924

INVENTORS.
Daniel E. Knowlton,
and Edward W. Donnigan,
by Parker, Brichwood & Bean,
ATTORNEYS.

Patented Mar. 15, 1927.

1,621,257

UNITED STATES PATENT OFFICE.

DANIEL E. KNOWLTON, OF BUFFALO, AND EDWARD W. DONNIGAN, OF ALDEN, NEW YORK.

METHOD OF HANDLING AND PRESERVING FISH AND THE LIKE.

Application filed October 13, 1924. Serial No. 743,271.

According to the methods commonly employed at the present time, of handling small fish, such as herrings, ciscoes and the like and preserving them by cold storage preparatory to smoking them, the fish, immediately after being caught, are cleaned, that is their entrails are removed on the fishing boat. When the boat arrives at the dock, the fish are removed from the tubs or other receptacles used on the boat and packed in large shipping boxes with ice beneath, above and between the layers of fish, and the boxes are shipped to the cold storage plant. At the cold storage plant the contents of the boxes are dumped into large troughs containing water, for the purpose of washing the fish and removing the dirt and ice. The fish are then arranged or packed closely edgewise, on their backs or stomachs, in shallow metal pans, each of a depth about equal to the height of the single layer of fish therein. These metal pans, each containing a layer of fish, are then placed in freezers to freeze the fish. After the fish are frozen, the pans are removed from the freezer and immersed in a water bath to warm the pans sufficiently to enable the fish, which are then frozen together in solid cakes in the pans, to be dumped out of the pans. The frozen cakes of fish, which are of substantially the dimensions of the pans, are then stacked in the cold storage rooms where they are retained in the frozen condition unitil the fish are to be shipped to the smoke houses, when they are removed from the cold storage rooms and the frozen cakes packed in boxes for shipment to smoke houses, several of the frozen cakes of fish being packed in each shipping box.

This method necessitates repeated handling of the fish, which aside from the labor and time entailed, results in more or less injury to the fish. The fish are broken or bruised and the scales dislodged in places in the first packing of the fish in the shipping boxes at the docks, and by the lumps of ice, which are frequently quite large, during transit of the fish to the cold storage plant as well as when dumping the fish from the packing boxes into the washing troughs and packing them in the metal freezing pans. Furthermore, there is a great difference in temperature between the frozen fish removed from the freezer, and the water in which the freezing pans are immersed for removing the frozen cakes of fish, and this great change in temperature heats the exposed surface portions of the fish so as to cause more or less of a cooking or oxidizing action which produce an exudation of the oil from the fish and a surface discoloration of the fish.

The purpose of this invention is to reduce the time, labor and expense of handling and preserving the fish, and prevent the bruising or injuring and discoloration of the fish in the handling or preservation thereof preparatory to the shipment of the fish to the smoke house or consumer; and also to reduce the expense of cold storage and shipment of the fish and ensure that they will be maintained in better condition and handled less.

According to our invention, the fish are packed in layers suitable for freezing in shallow covered boxes or receptacles. These shallow boxes or receptacles are preferably made of corrugated packing board, paper board or other light, inexpensive material having the requisite stiffness, and are coated with paraffin or are otherwise treated to render the boxes waterproof. Preferably the boxes or receptacles are made of about the same dimensions as the sheet metal freezing pans heretofore used, that is about 15"x 25"x 2", so that each box is adapted to contain a single layer of the fish arranged edgewise in the box. The box is also preferably provided with a removable telescoping cover made of the same material as the body of the box and waterproofed. The boxes with the fish packed therein are placed in the freezer and the fish frozen in the boxes. When placing the filled boxes in the freezer, they are preferably turned over and laid on their tops on the freezing coils. This permits the water to drain off of the wet fish and accumulate in the inverted cover of the box, so that when it freezes, the ice will seal the joint surrounding the body of the box, between the same and the cover, thus firmly securing the cover in place and providing an air tight enclosure for the fish, which is a further aid to the perfect preservation of the fish. After the fish are frozen, the boxes are removed from the freezer and are placed or stacked directly in the cold storage room without removing the fish from the boxes, or in any wise handling or disturbing the fish, and the fish remain undisturbed in the boxes throughout the cold storage period, after which, the boxes with the frozen cakes of fish still therein are removed from the cold storage room and are shipped to the smoke houses or consumers. The fish thus remain in the boxes from the time they are packed therein before freezing until they are removed at the smoke houses or by the consumers. Since the frozen cakes of fish are not removed from the boxes when changing the fish from the freezer to the cold storage room, as in the previous method, this avoids the necessity of immersing the fish in the water to remove them from the pans, with the consequent objectionable heating and handling of the frozen cakes of fish. Furthermore, the described method prevents the injury to the fish consequent upon handling and packing the exposed cakes of fish, and prevents bruising and breaking the surface portions of the fish. The cakes, when handled as heretofore, without the protecting boxes, also frequently break in pieces, and this adds to the labor and trouble of packing the cakes, and also results in further injury to the fish. The boxes prevent the breaking of the cakes and also prevent the bruising or breaking of the surface portions of the fish heretofore caused in placing the frozen cakes in and removing them from the cold storage room, and in the subsequent packing of the fish in the shipping boxes. Since the boxes described are inexpensive to make, they can be discarded after the delivery of the fish to the smoke houses.

The above description of this method relates more particularly to handling or treatment of the fish from the time that they are received at the cold storage plant. Preferably, however, instead of packing the fish in the shallow paper board boxes after they arrive at the cold storage plant, the fish are placed directly in the boxes in the first instance, on board the fishing boats, immediately after they have been cleaned and washed. When the fish are thus packed in the boxes on board the fishing boats, the layers of fish in the boxes are covered with finely crushed or pebble ice, and the fish are shipped in the boxes directly to the cold storage plant. When they reach the cold storage plant, the shallow boxes containing the fish are placed directly in the freezer without disturbing the fish or removing them from the boxes, the boxes being preferably inverted when placed in the freezer to form the ice seals for the boxes, as before explained. From this point, the method is the same as before described. By packing the fish in the first instance in the shallow boxes, in which they remain throughout the freezing, cold storage treatment and shipment to and from the cold storage plant, there are eliminated the previously used steps of packing the fish with ice in large boxes at the docks for shipment to the cold storage plant, as well as the subsequent washing and packing of the fish in shallow freezing receptacles at the cold storage plant.

The closed boxes or receptacles, in addition to preventing injury to the fish, which resulted from the handling of the exposed frozen cakes, also prevents evaporation of the juices, and consequent loss in weight of the product. The cakes of fish in the shallow boxes can be handled more readily than the bare cakes, and the boxes do not add objectionably to the weight or bulk of the cakes. The fish in the shallow boxes can be handled and placed in the cars or other conveyances with much less trouble and expense than the larger wooden boxes in which it has been customary to pack or ship the frozen cakes, and the paper boxes save weight and shipping expense as well as reducing the initial expense of the wooden boxes.

Figure 1:
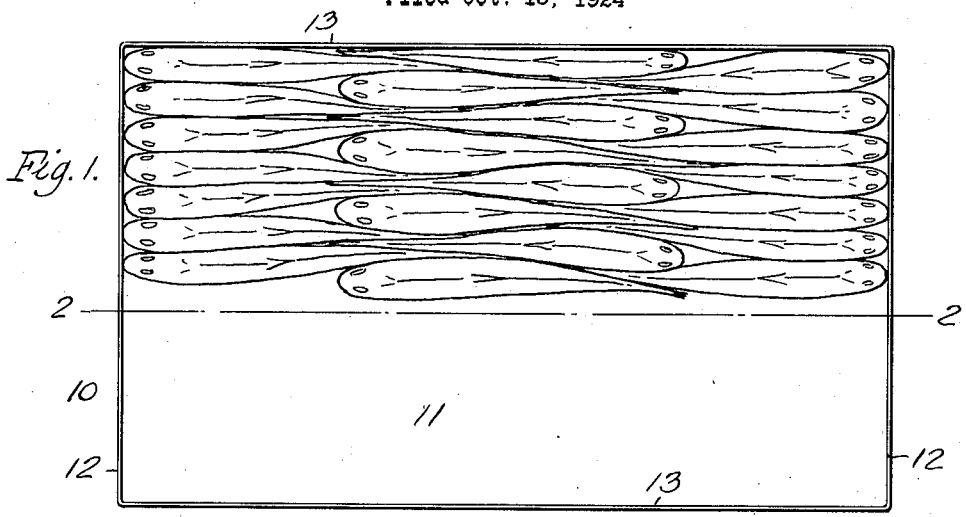
Fig. 1 is a reduced plan view of a box or receptacle packed with fish according to the method embodying this invention, the cover being removed.
Figure 2:
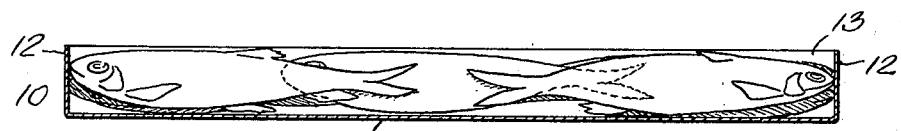
Fig. 2 is a sectional elevation thereof, on line 2—2, Fig. 1.
Figure 3:
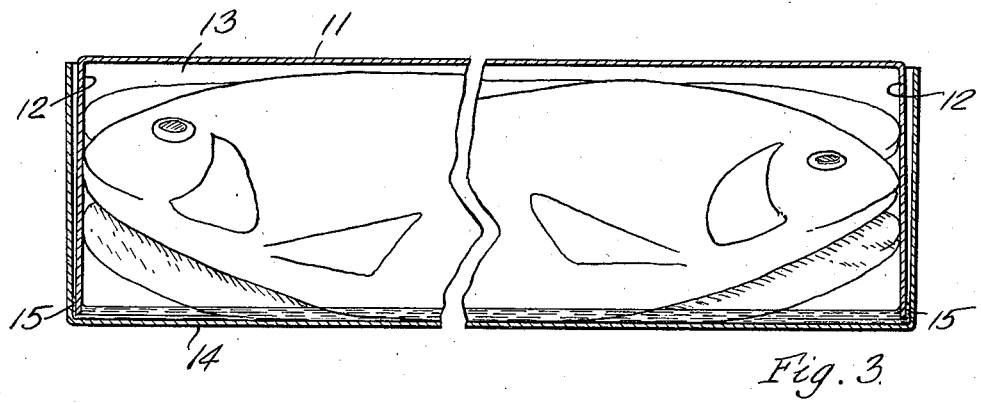
Fig. 3 is a sectional view of the box inverted and showing the ice seal for the joint between the box body and cover.
Figure 4:
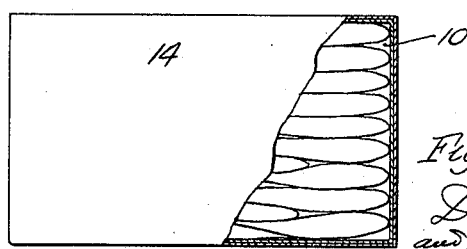
Fig. 4 is a reduced plan view, partly in section, of the filled and covered box.

The box or receptacle comprises a body 10 which is preferably made of corrugated packing board or other light, stiff cardboard or analagous inexpensive material, and has a bottom 11 and upright ends 12 and sides 13 which are stapled or connected in any suitable manner at the corners so as to provide strong, tight corner joints. The body thus formed is preferably soaked in paraffin or otherwise suitably treated to make it moisture-proof. The cover 14 of the box is preferably made of the same material and formed and waterproofed in the same manner as the body, being of sufficiently larger size to slip or telescope over the upright walls of the body. 15, Fig. 3, indicates the ice seal between the edges of the body and the cover of the box.

We claim as our invention:

1. The hereindescribed method of preserving comestibles such as fish, which consists in packing the comestibles in shallow receptacles, freezing the comestibles while in said receptacles to freeze the comestibles into shallow cakes in the receptacles, and storing said receptacles with the frozen cakes still contained therein and leaving the comestibles in said receptacles during the storage period, and maintaining the comestibles in the frozen condition during said storage period.

2. The hereindescribed method of handling and preserving comestibles such as fish, which consists in packing the comestibles at the place of origin with crushed ice in shallow receptacles, transporting the comestibles in said receptacles to the place of cold storage, freezing the comestibles while still remaining in said receptacles, and then maintaining the comestibles while still retained in said receptacles at a sufficiently low temperature to keep the comestibles in the frozen state.

3. The hereindescribed method of preserving comestibles such as fish, which consists in packing the comestibles in shallow covered boxes, inverting said boxes to permit water therein to settle and seal the joint between the body and cover of the box, then freezing the comestibles and water while in said boxes, and maintaining the comestibles while still retained in said boxes at a sufficiently low temperature to keep the comestibles in the frozen state.

4. The hereindescribed method of preparing and preserving fish, which consists in packing the fish in a shallow layer in a shallow box having a telescoping cover and in which there is sufficient water to form a seal between the body and cover of the box, inverting said box to permit the water therein to settle into the joint between the body and cover of the box, subjecting the box containing the fish while inverted to a low temperature to freeze the fish and water in the box, and maintaining the box and the fish contained therein in cold storage to retain the fish in the frozen state in the box until required for use.

DANIEL E. KNOWLTON.
EDWARD W. DONNIGAN.